US012327438B2

(12) United States Patent
Yamaoka et al.

(10) Patent No.: US 12,327,438 B2
(45) Date of Patent: Jun. 10, 2025

(54) DATA COLLECTION SYSTEM, COLLECTION CENTER AND DATA COLLECTION METHOD

(71) Applicant: DENSO CORPORATION, Kariya (JP)

(72) Inventors: Kousuke Yamaoka, Kariya (JP); Yoshinori Atake, Kariya (JP)

(73) Assignee: DENSO CORPORATION, Kariya (JP)

( * ) Notice: Subject to any disclaimer, the term of this patent is extended or adjusted under 35 U.S.C. 154(b) by 192 days.

(21) Appl. No.: 18/067,887

(22) Filed: Dec. 19, 2022

(65) Prior Publication Data

US 2023/0119474 A1 Apr. 20, 2023

Related U.S. Application Data

(63) Continuation of application No. PCT/JP2021/021492, filed on Jun. 7, 2021.

(30) Foreign Application Priority Data

Jun. 22, 2020 (JP) ................................ 2020-107104

(51) Int. Cl.
*G07C 5/00* (2006.01)

(52) U.S. Cl.
CPC .................................. *G07C 5/008* (2013.01)

(58) Field of Classification Search
None
See application file for complete search history.

(56) References Cited

U.S. PATENT DOCUMENTS

2019/0066403 A1* 2/2019 Nagura ................. G07C 5/085

FOREIGN PATENT DOCUMENTS

JP 2019056559 A 4/2019
JP 2019153128 A 9/2019

* cited by examiner

*Primary Examiner* — Hongye Liang
(74) *Attorney, Agent, or Firm* — Harness, Dickey & Pierce, P.L.C.

(57) ABSTRACT

A data collection system includes: an alternativity determination unit determining whether or not data has alternativity, allowing replacement of the data with alternative data when a data necessity inquiry transmitted from an in-vehicle terminal is received by a center-side reception unit; and a center-side transmission unit (i) transmitting a discard notice back to the in-vehicle terminal that has transmitted the data necessity inquiry, and letting the in-vehicle terminal to discard the data based on a determination by the alternativity determination unit that the data has alternativity, and (ii) transmitting a keeping notice back to the in-vehicle terminal that has transmitted the data necessity inquiry, and letting the in-vehicle terminal to keep the data based on a determination by the alternativity determination unit that the data has no alternativity.

8 Claims, 11 Drawing Sheets

DATA COLLECTION SYSTEM, COLLECTION CENTER AND DATA COLLECTION METHOD

CROSS REFERENCE TO RELATED APPLICATION

The present application is a continuation application of International Patent Application No. PCT/JP2021/021492 filed on Jun. 7, 2021, which designated the U.S. and claims the benefit of priority from Japanese Patent Application No. 2020-107104 filed on Jun. 22, 2020. The entire disclosure of all of the above application is incorporated herein by reference.

TECHNICAL FIELD

The present disclosure relates to a data collection system, a collection center, and a data collection method.

BACKGROUND ART

It is known that data acquired by a traveling vehicle is transmitted from an in-vehicle terminal to a center by wireless communication, so that the center collects data of a plurality of vehicles and enables secondary utilization of such data. For example, there is known a technique for automatically generating a map using data collected by a center from a plurality of vehicles. As the range of utilization of data collected from vehicles by the center is expanding, the amount of data communication between in-vehicle terminals and base stations is increasing year by year. When the amount of data communication between the in-vehicle terminal and the base station increases, problems such as a decrease in communication speed and a decrease in communication quality are likely to occur.

SUMMARY

This section provides a general summary of the disclosure, and is not a comprehensive disclosure of its full scope or all of its features.

According to one aspect of the present disclosure, there is provided a data collection system which includes: an in-vehicle terminal including a data acquisition unit mounted on a vehicle and acquiring data acquired during a travel of the vehicle, and a vehicle-side transmission unit transmitting the data acquired by the data acquisition unit; and a collection center including a center-side reception unit receiving the data transmitted from in-vehicle terminals of multiple vehicles. The in-vehicle terminal further includes a temporary storage unit temporarily storing the data acquired by the data acquisition unit until the data becomes transmittable by the vehicle-side transmission unit, and a capacity shortage prediction unit predicting a shortage of a storage capacity of the temporary storage unit, and the vehicle-side transmission unit transmits, to the collection center, a data necessity inquiry about necessity of the data when (i) the data acquisition unit has acquired the data and (ii) the capacity shortage prediction unit predicts a shortage of the storage capacity of the temporary storage unit, and the center-side reception unit of the collection center receives the data necessity inquiry transmitted from the in-vehicle terminal. The collection center further includes an alternativity determination unit determining whether or not the data has alternativity when the data necessity inquiry transmitted from the in-vehicle terminal is received by the center-side reception unit, wherein the data is determined to have alternativity when the data is replaceable with alternative data, a center-side transmission unit (i) transmitting a discard notice back to the in-vehicle terminal that has transmitted the data necessity inquiry, and letting the in-vehicle terminal to discard the data based on a determination by the alternativity determination unit that the data has alternativity, and (ii) transmitting a keeping notice back to the in-vehicle terminal that has transmitted the data necessity inquiry, and letting the in-vehicle terminal to keep the data based on a determination by the alternativity determination unit that the data has no alternativity, and the in-vehicle terminal further includes a storage processing unit (i) discarding, upon receiving the discard notice, the necessity-inquired data, for not storing the data in the temporary storage unit, and (ii) storing, upon receiving the keeping notice, the necessity-inquired data in the temporary storage unit, and the collection center includes a possibility determination unit determining a re-acquisition possibility, which is a possibility of reacquiring the data that is determined, by the alternativity determination unit, to have alternativity, and, when the alternativity determination unit has determined that the data has the alternativity, the center-side transmission unit (i) transmits in reply the discard notice to the in-vehicle terminal that has transmitted the data necessity inquiry based on a condition that the data has the reaquirability of equal to or above a threshold value, and (ii) transmits in reply the keeping notice to the in-vehicle terminal that has transmitted the data necessity inquiry based on a condition that the data has the reaquirability of less than the threshold value.

According to the present disclosure, there is also provided a collection center, and a data collection method implementing the above.

DESCRIPTION OF EMBODIMENTS

Figure 1:
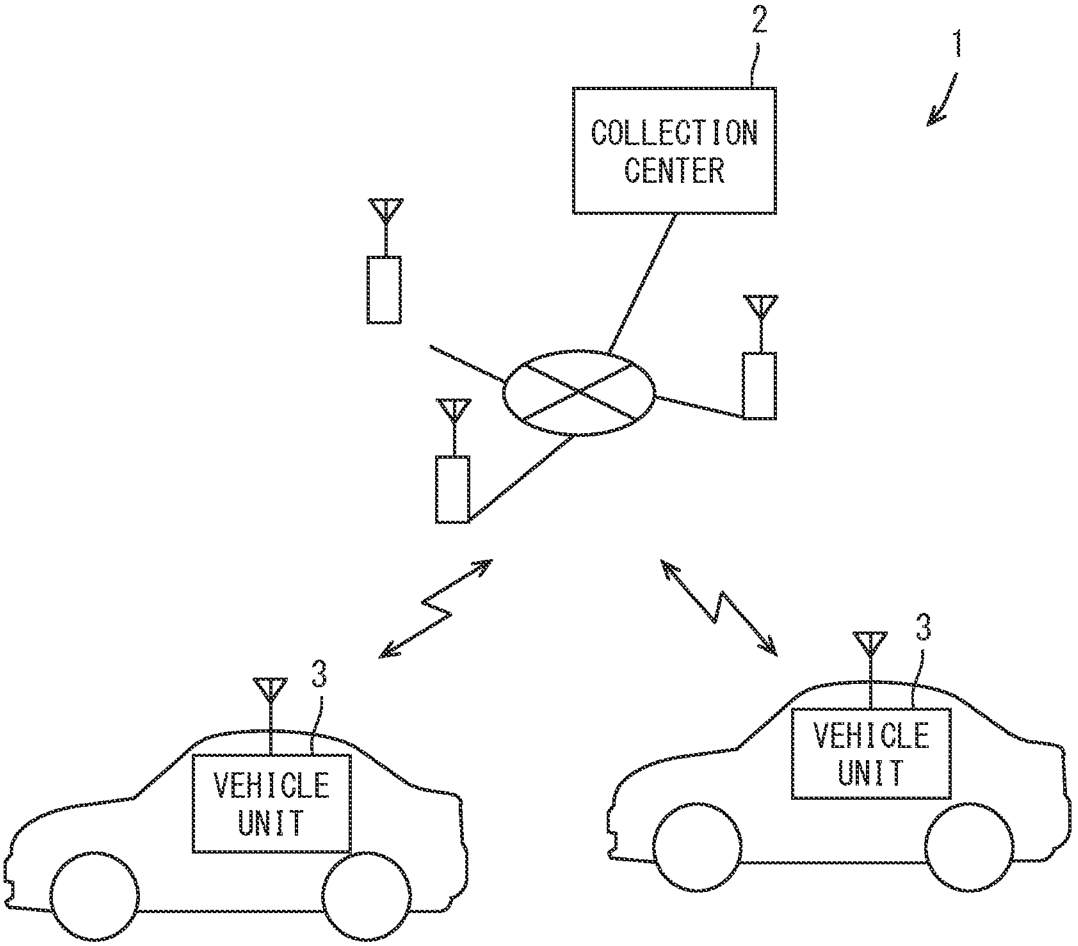
FIG. 1 is a diagram showing an example of a schematic configuration of a data collection system.

Multiple embodiments will be described for disclosure hereinafter with reference to the drawings. For convenience of description, the parts having the same functions as the parts shown in the drawings used in the description up to that point in multiple embodiments may be designated by the same reference symbols, and the description thereof may be omitted. Description in other applicable embodiments may be referred to for such a portion denoted by the identical reference symbols.

First Embodiment

<Schematic Configuration of Data Collection System 1>

The following will describe the first embodiment of the present disclosure with reference to the accompanying drawings. First, a data collection system 1 will be described with reference to FIG. 1. As shown in FIG. 1, the data collection system 1 includes a collection center 2 and a vehicle unit 3 used in a vehicle. It is assumed that the data collection system 1 includes the vehicle units 3 of a plurality of vehicles.

The collection center 2 may be, for example, a server. The collection center 2 may be composed of one server or may be composed of a plurality of servers. The collection center 2 may be, for example, a server on a cloud or a distributed network such as a blockchain. The collection center 2 receives data transmitted from the vehicle unit 3. The collection center 2 stores the data received from the vehicle unit 3 in a storage device, and transfers the data to another center that uses the data. The details of the collection center 2 will be described later.

Examples of using the data received from the vehicle unit 3 include an example such as using the captured image data for map generation and machine learning. Examples of using the captured image data for map generation include use of the data for street view and use of the data for SLAM (Simultaneous Localization and Mapping). Examples of using the captured image data for machine learning include use of the data for training of detection algorithms such as walking.

The collection center 2 may transmit information about the data to collect from the vehicle (hereinafter, collection needs) to the vehicle unit 3. For example, the collection needs may be specified as a type of required data, an acquisition position, and the like.

The vehicle unit 3 communicates data with the collection center 2. The vehicle unit 3 transmits, to the collection center 2, data acquired by a travel of a vehicle on which a subject vehicle unit is mounted. The vehicle referred to here may be, for example, an automobile. Details of the vehicle unit 3 will be described in the following.

<Schematic Configuration of the Vehicle Unit 3>

Figure 2:
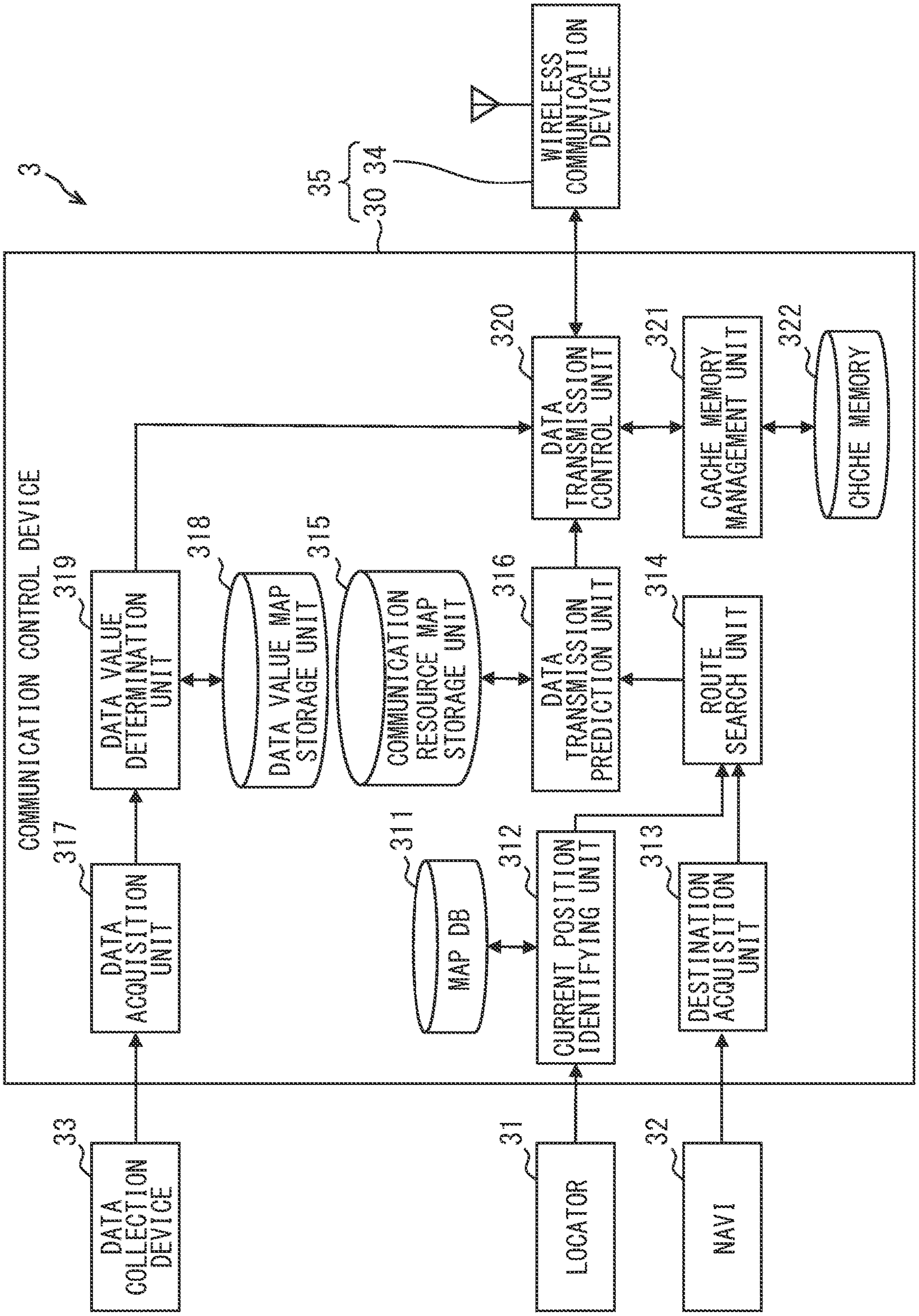
FIG. 2 is a diagram showing an example of a schematic configuration of a vehicle unit and a communication control device.

A schematic configuration of the vehicle unit 3 will be described with reference to FIG. 2. As shown in FIG. 2, the vehicle unit 3 includes a communication control device 30, a locator 31, a navigation device 32, and a wireless communication device 34. Hereinafter, the vehicle equipped with the vehicle unit 3 is referred to as a subject vehicle.

The locator 31 includes a GNSS (Global Navigation Satellite System) receiver and an inertia sensor. The GNSS receiver receives positioning signals from multiple positioning satellites. The inertia sensor includes a gyro sensor and an acceleration sensor, for example. The locator 31 sequentially locates a vehicle position of the subject vehicle by combining a positioning signal received by the GNSS receiver and a measurement result of the inertia sensor. For example, the vehicle position may be measured based on a travel distance acquired from detection results sequentially output from a vehicle speed sensor mounted on the subject vehicle.

The navigation device 32 provides route guidance that guides a user of the subject vehicle to a preset destination. As a destination of the subject vehicle, for example, the destination may be set according to an operation input received from the user via an operation input unit. As for a departure place, for example, the current position of the subject vehicle may be set as the departure place.

The data collection device 33 collects data by acquiring data (hereinafter referred to as target data) to be transmitted from the subject vehicle to the collection center 2. The data to be transmitted from the subject vehicle to the collection center 2 means that it is a candidate for transmission, and may be not transmitted. The target data acquired by the data collection device 33 is data acquired by a travel of the subject vehicle. Examples of the target data acquired by the data collection device 33 include obstacle detection data, captured image data, and the like. It should be noted that the above description is merely an example, and the data collection device 33 may be configured to acquire other data.

The obstacle detection data may be the data of a detection result of an obstacle generated when the obstacle around the subject vehicle is detected by a peripheral monitoring sensor mounted on the subject vehicle. Obstacles may preferably be detected by distinguishing the types of obstacles such as pedestrians, surrounding vehicles, and road obstacles. When the peripheral monitoring sensor is a camera, these distinctions may be made by image recognition. Further, when the peripheral monitoring sensor is a range-finding sensor such as a millimeter-wave radar, these distinctions may be made according to the shape, size, etc. of the obstacle indicated by a range-finding point.

The captured image data may be the data of the captured image generated when the periphery of the vehicle is imaged by the camera among the peripheral monitoring sensors mounted on the vehicle. An image pickup direction with the camera is not limited to a front of the subject vehicle. For example, the captured image data acquired by the data collection device 33 may be captured image data that meets collection needs received from the collection center 2.

In addition to the target data, the data collection device 33 also acquires generation time information regarding a generation time of the data associated to the target data. The generation time information is, for example, data including a data type, a data generation time, a data generation position, and the like. The data type is information indicating the type of data. The data generation time is information indicating a time when the data was generated. The data generation position is information indicating a position on a map where the data was generated. The data generation position may be specified based on the position of the subject vehicle sequentially located by the locator 31 of the subject vehicle.

The wireless communication device 34 transmits and receives information via wireless communication according to a control of the communication control device 30. The wireless communication device 34 corresponds to a vehicle-side transmission unit. The wireless communication device 34 communicates with the collection center 2 via a public communication network, a base station, or the like. The wireless communication device 34 may be configured to be able to use, for example, a plurality of types of communication channels having different communication costs. The plurality of types of communication channels that can be used by the wireless communication device 34 may be three or more types. As an example, as a communication channel having a higher communication cost, a cellular channel such as LTE (Long Term Evolution) can be mentioned. On the other hand, as a communication channel having a lower communication cost, Wi-Fi (registered trademark) can be mentioned.

The communication control device 30 includes, for example, a processor, a memory, an I/O, and a bus connecting these, and by executing a control program stored in the memory, a process related to transmission of data acquired by the subject vehicle (hereinafter, a data transmission-related process) is executed. The memory referred to here is a non-transitory, tangible storage medium that stores computer-readable programs and computer-readable data. The non-transitory, tangible storage medium is implemented by a semiconductor memory or the like. The communication control device 30 once receives the data collected by the data collection device 33, controls a transmission timing and a transmission order, and causes the wireless communication device 34 to transmit such data. Details of the communication control device 30 will be described in the following.

<Schematic Configuration of Communication Control Device 30>

Subsequently, a schematic configuration of the communication control device 30 will be described with reference to FIG. 2. As shown in FIG. 2, the communication control device 30 includes a map database (hereinafter, map DB) 311, a current position identifying unit 312, a destination acquisition unit 313, a route search unit 314, a communication resource map storage unit 315, a data transmission prediction unit 316, a data acquisition unit 317, a data value map storage unit 318, a data value determination unit 319, a data transmission control unit 320, a cache memory management unit 321 and a cache memory 322, which are provided as functional blocks. It should be noted that a part or all of the functions executed by the communication control device 30 may be configured as hardware by one or a plurality of ICs or the like. Further, a part or all of the functional blocks included in the communication control device 30 may be realized by a combination of software executed by a processor and hardware components. The configuration including the communication control device 30 and the wireless communication device 34 corresponds to an in-vehicle terminal 35.

The map DB 311 stores map data such as link data, node data, a road shape and the like. The map DB 311 may be a non-volatile memory or a volatile memory. When the map DB 311 is configured as a volatile memory, the map data may be temporarily stored from the outside of the communication control device 30. The map DB 311 may also be configured as a non-volatile memory and may be provided outside the communication control device 30. The map data stored in the map DB 311 may be acquired from the outside of the subject vehicle via the wireless communication device 34.

The current position identifying unit 312 identifies the current position of the subject vehicle on the map from the vehicle position determined by the locator 31 and the map data stored in the map DB 311. As an example, the current position of the subject vehicle on the map may be specified by using the map matching technique.

The destination acquisition unit 313 acquires a destination of the subject vehicle set by the navigation device 32. The route search unit 314 searches for a recommended route from the current position of the subject vehicle to the destination by using the current position of the subject vehicle detected by the current position identifying unit 312 and the destination acquired by the destination acquisition unit 313. The route search unit 314 may search for a recommended predicted route according to preset search conditions such as time priority and distance priority, for example, using the Dijkstra method.

Note that the destination acquisition unit 313 is not limited to the configuration for acquiring the destination of the subject vehicle set by the navigation device 32. The destination acquisition unit 313 may also be configured to acquire the destination of the subject vehicle set by other means than the navigation device 32. For example, the destination acquisition unit 313 may be configured to acquire a destination in an automatic driving in which acceleration/deceleration and steering are automatically performed. Further, the destination acquisition unit 313 and the route search unit 314 may be configured as components provided outside the communication control device 30.

The communication resource map storage unit 315 stores a communication resource map showing a correspondence between a point and an amount of communication resources estimated to be available for communication at that point. As the communication resource map storage unit 315, the non-volatile memory of the communication control device 30 may be used. The point may be provided as position information. The amount of communication resources may be expressed by a communication speed, a communication delay, or the like. Note that the amount of communication resources may be a usable capacity, a usable communication band width or the like. As the communication speed, for example, an amount of data that can be transferred per second for uploading and downloading may be used. As the delay time, for example, a communication delay time for uploading and downloading may be used. It is assumed that the amount of communication resources increases when the communication speed increases or the communication delay decreases, and the amount of communication resources decreases when the communication speed decreases or the communication delay increases. The communication resource map may be stored in the communication resource map storage unit 315 for each of time slots. The time slot may be provided as an even time slot, such as a slot of every three hours, or may be provided as an uneven time slot having longer and shorter time slots. Further, in order to reduce the communication load at the time of data distribution, the communication resource map is preferably stored in the communication resource map storage unit 315 for each of a plurality of regions. As an example, the communication resource map may have a configuration in which the amount of communication resources represented by a combination of communication speed and communication delay is set for each rectangular area defined in a grid pattern on the map.

The data transmission prediction unit 316 predicts when, at what point, and how much data can be transmitted from the predicted route searched by the route search unit 314 and the communication resource map stored in the communication resource map storage unit 315.

The data acquisition unit 317 acquires the target data collected by the data collection device 33 and the generation time information of the target data. The process of acquiring the target data in the data acquisition unit 317 corresponds to a data acquisition process. The data value map storage unit 318 stores a data value map required for determining a data value, which is a value index of the target data. As the data value map storage unit 318, the non-volatile memory of the communication control device 30 may be used. In the data value map, for example, a data value, a data type, and a data position may be associated with each other. The data value map may be configured to be updated according to the collection needs received from the collection center 2. More specifically, the data value may be updated so that the data type at the data position where the collection need is high becomes higher.

The data value determination unit 319 determines a data value of the target data, with reference to a data value map stored in the data value map storage unit 318 based on the target data acquired by the data acquisition unit 317 and the generation time information of the target data. This data value determination unit 319 corresponds to a value determination unit. The data value determination unit 319 may make a determination by correcting the data value to a lower value as a lapse time from the data generation time of the target data becomes longer. The amount of correction of the data value according to the lapse time from the data generation time may be different depending on the data type.

The data transmission control unit 320 controls a transmission timing of the target data acquired by the data acquisition unit 317. The details of the process in the data transmission control unit 320 will be described later. The cache memory management unit 321 manages reading/writing, data deletion, data update, and data priority (that is, priority order) of the cache memory 322. The details of the process in the cache memory management unit 321 will be described later. The cache memory 322 temporarily stores data. The cache memory 322 may be, for example, a volatile memory. The cache memory 322 corresponds to a temporary storage unit.

<Data Acquisition Related Process>

Figure 3:
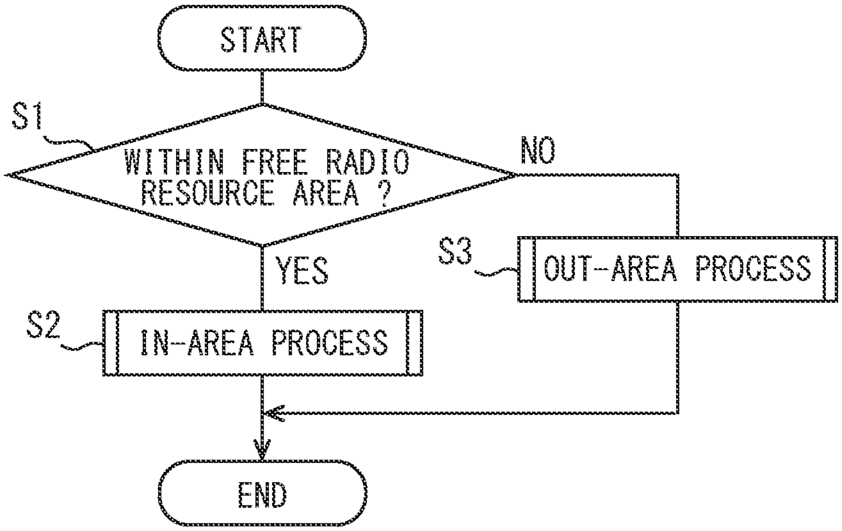
FIG. 3 is a flowchart showing an example of a flow of a target data transmission-related process in the communication control device.
Figure 4:
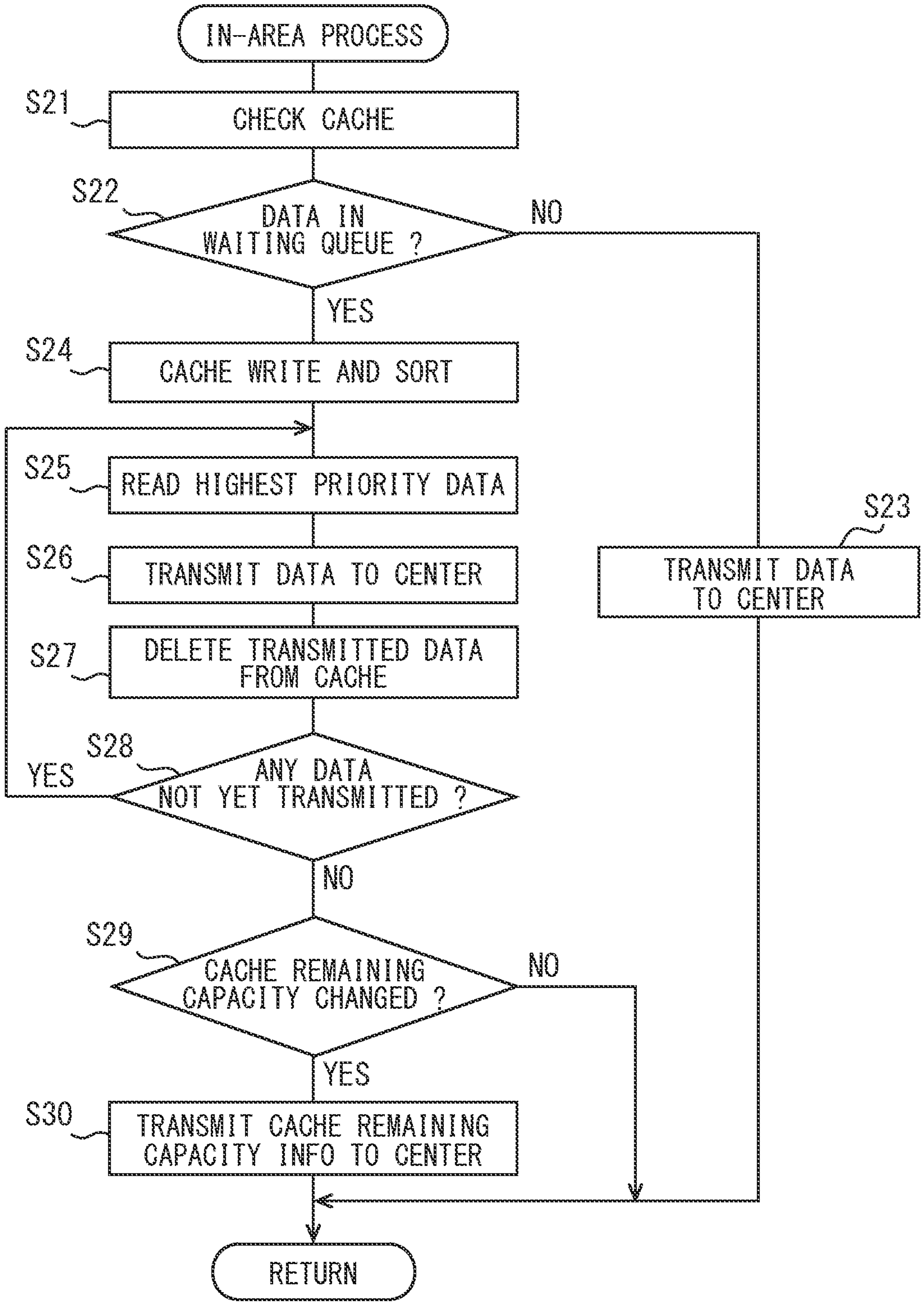
FIG. 4 is a flowchart showing an example of a flow of an in-area process of the target data transmission-related process.
Figure 5:
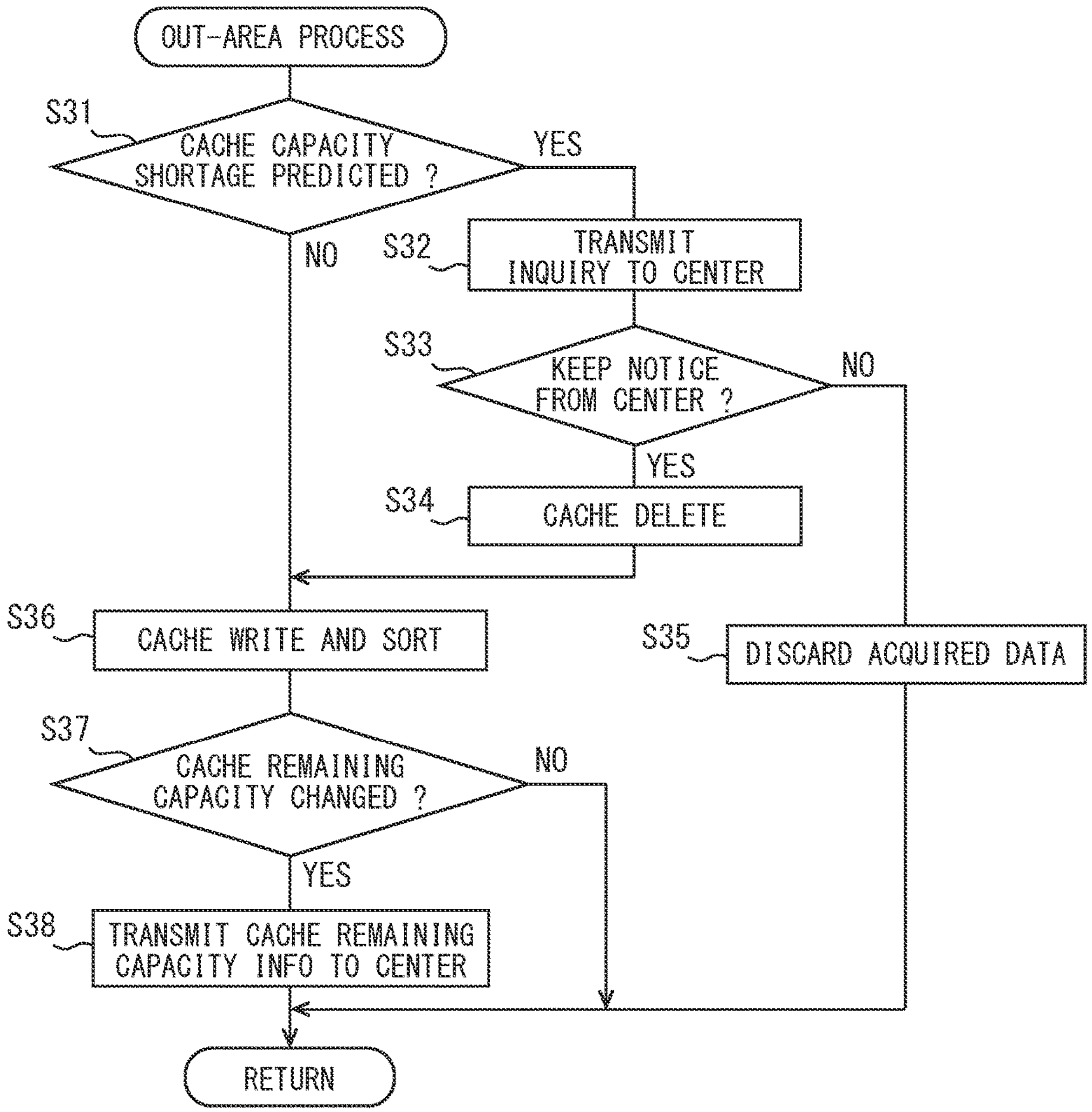
FIG. 5 is a flowchart showing an example of a flow of an out-area process of the target data transmission-related process.

Here, an example of a flow of the process related to a transmission of the target data in the communication control device 30 (hereinafter referred to as a target data transmission-related process) will be described with reference to the flowcharts of FIGS. 3 to 5. The flowchart of FIG. 3 may be configured to start each time data is acquired by the data acquisition unit 317.

First, in step S1, it is determined whether or not the data transmission control unit 320 is within a free radio resource area where communication resource such as a required bandwidth is available for transmitting, to the collection center 2, the target data acquired by the data acquisition unit 317. For example, whether or not the data transmission control unit 320 is within the free radio resource area may be determined based on the communication resource map stored in the communication resource map storage unit 315. As an example, more practically, it may be determined whether or not the amount of the target data falls within a communicable capacity of a point corresponding to the current position of the subject vehicle.

Then, when the data transmission control unit 320 determines that it is within the free radio resource area (YES in S1), the process proceeds to step S2. On the other hand, when it is determined that it is outside the free radio resource area (NO in S1), the process proceeds to step S3.

In step S2, an in-area process is performed, and the target data transmission-related process ends. Here, an example of the flow of the in-area process will be described with reference to the flowchart of FIG. 4.

In step S21, the cache memory management unit 321 performs a cache check to see if there is not-yet-transmitted target data (hereinafter, untransmitted data) in the cache memory 322. Then, in step S22, if there is untransmitted data in a waiting queue for transmission (YES in S22), the process proceeds to step S24. On the other hand, if there is no untransmitted data in the waiting queue for transmission (NO in S22), the process proceeds to step S23.

In step S23, since there is no target data waiting to be transmitted, the data transmission control unit 320 immediately transmits the target data acquired by the data acquisition unit 317 from the wireless communication device 34 to the collection center 2, and ends the in-area process. On the other hand, in step S24, the cache memory management unit 321 writes the target data acquired by the data acquisition unit 317 to the cache memory 322. Then, the cache memory management unit 321 sorts the target data acquired this time and the untransmitted target data in the cache memory 322 in order of priority. As for the priority, the higher the data value determined by the data value determination unit 319 is, the higher the priority becomes.

In step S25, the cache memory management unit 321 reads out the target data having the highest priority from among the target data stored in the cache memory 322. In step S26, the data transmission control unit 320 causes the wireless communication device 34 to transmit the target data read in S25 to the collection center 2. The process in which the wireless communication device 34 transmits the target data read in S25 to the collection center 2 corresponds to the data transmission process. In step S27, the cache memory management unit 321 performs cache delete to delete the target data transmitted in S26 from the cache memory 322.

In step S28, if there is untransmitted target data within a range of free radio resources (YES in S28), the process returns to S25 and the process of S25 is repeated. On the other hand, if there is no untransmitted target data within the range of free radio resources (NO in S28), the process proceeds to step S29.

In step S29, the cache memory management unit 321 checks a remaining capacity of the cache memory 322. Then, if the remaining capacity has changed from a capacity before the start of the target data transmission-related process (YES in S29), the process proceeds to step S30. On the other hand, if the remaining capacity has not changed (NO in S29), the in-area process ends. In step S30, the data transmission control unit 320 causes the wireless communication device 34 to transmit remaining capacity information of the cache memory 322 of the subject vehicle from the wireless communication device 34 to the collection center 2, and ends the in-area process. The remaining capacity information may be any information as long as it can specify the remaining capacity of the cache memory 322, which may be a ratio of the remaining capacity to the total capacity of the cache memory 322, or the remaining capacity itself.

It should be noted that, if the remaining capacity information is transmitted to the collection center 2 for each of small changes in the remaining capacity, the communication load will increase. Therefore, in S29, it may be preferable to treat, as a change in the remaining capacity, a change in the remaining capacity above a certain level/amount. For example, a situation, in which the total capacity of the cache memory 322 may be divided into a couple of levels and when the level of the remaining capacity changes in those levels, may be considered as a change in the remaining capacity. For example, when 1 GB is the total capacity, 100 MB may be set as one level, and the level of the remaining capacity may be indicated as level 1 to level 10.

Further, the data transmission control unit 320 may also transmit the predicted route of the subject vehicle searched by the route search unit 314 to the collection center 2 when the target data is transmitted to the collection center 2 in S23. In addition, when the data transmission control unit 320 transmits the remaining capacity information of the subject vehicle to the collection center 2 in S30, the predicted route of the subject vehicle searched by the route search unit 314 may also be transmitted to the collection center 2. Further, the data transmission control unit 320 may be configured to transmit the current position of the subject vehicle identified by the current position identifying unit 312 to the collection center 2 in addition to the predicted route of the subject vehicle.

Returning to FIG. 3, in step S3, an out-area process is performed, and the target data transmission-related process is completed. Here, an example of the flow of the out-area process will be described using the flowchart of FIG. 5.

In step S31, the data transmission control unit 320 predicts a shortage of the storage capacity for storing the target data acquired by the data acquisition unit 317 in the cache memory 322. The data transmission control unit 320 corresponds to a capacity shortage prediction unit. The process step of S31 corresponds to the capacity shortage prediction process. The prediction may be made, for example, from (i) the remaining capacity of the cache memory 322 at the present time, (ii) (a) the amount of data that can be transmitted in the future and (b) the amount of collected data in the future, respectively predicted by the data transmission prediction unit 316. The future mentioned here may be, for example, a timing when the next base station area is reached. The predicted amount of collected data may be predicted from, for example, a data collection schedule of the data collection device 33. Alternatively, the predicted amount of collected data may be derived from an average amount of data collected by the data collection device 33 per travel distance. When the remaining capacity is shown as a ratio to the total capacity, the information on the total capacity of the cache memory 322 may also be used. Further, the shortage of the storage capacity does not necessarily mean that the remaining storage capacity (hereinafter referred to as the remaining capacity) is 0. For example, the shortage may mean that the remaining capacity is less than a specified amount such as 30% of the total capacity. This specified amount is a parameter that determines an average usage rate of the cache memory 322 of an operating vehicle.

Then, in step S31, when it is determined that the storage of the capacity is predicted (YES in S31), the process proceeds to step S32. On the other hand, in step S31, when it is determined that the storage of the capacity is not predicted (NO in S31), the process proceeds to step S36.

In step S32, the data transmission control unit 320 causes the wireless communication device 34 to transmit an inquiry regarding the necessity of the target data acquired by the data acquisition unit 317 (i.e., data necessity inquiry) to the collection center 2. The process of transmitting a data necessity inquiry from the wireless communication device 34 to the collection center 2 corresponds to a necessity inquiry process. The data necessity inquiry for inquiring the necessity of the target data may include the amount of the target data, the generation time information, the predicted route of the subject vehicle searched by the route search unit 314, the current position of the subject vehicle identified by the current position identifying unit 312, the remaining capacity information of the cache memory 322, a remaining capacity predicted value of the cache memory 322, and the like. The remaining capacity predicted value is predicted from, for example, the remaining capacity of the cache memory 322 at the present time, the amount of data that can be transmitted in the future predicted by the data transmission prediction unit 316, and the amount of collected data in the future predicted by the data transmission control unit 320. From the collection center 2 that has received the inquiry as to whether or not the target data is necessary (i.e., data necessity inquiry), a discard notice or a keeping notice, which will be described later, is transmitted in reply. Then, the wireless communication device 34 receives the discard notice or the keeping notice, and notifies the received notice to the data transmission control unit 320.

In step S33, when the keeping notice is returned from the collection center 2 (YES in S33), the process proceeds to step S34. On the other hand, when the discard notice is returned from the collection center 2 (NO in S33), the process proceeds to step S35.

In step S34, the cache memory management unit 321 performs the cache delete that deletes the target data having the lowest priority from among the target data stored in the cache memory 322, and the process proceeds to step S36. On the other hand, in step S35, the cache memory management unit 321 discards the target data acquired by the data acquisition unit 317 without writing it to the cache memory 322, and ends the out-area process.

In step S36, the cache memory management unit 321 writes the target data acquired by the data acquisition unit 317 to the cache memory 322. That is, the target data for which the data necessity inquiry has been sent in S32 is stored in the cache memory 322. Therefore, the cache memory management unit 321 corresponds to a storage processing unit. Further, the processing steps of S35 and S36 correspond to a storage processing process. Then, in step S36, similar to S24, the cache memory management unit 321 sorts the target data acquired this time and the untransmitted target data in the cache memory 322 in order of priority.

In step S37, the cache memory management unit 321 checks the remaining capacity of the cache memory 322 in the same manner as in S29. Then, if the remaining capacity has changed from before the start of the target data transmission-related process (YES in S37), the process proceeds to step S38. On the other hand, if the remaining capacity has not changed (NO in S37), the out-area process ends. In step S38, the same process as in S30 is performed to end the out-area process.

<Schematic Configuration of Collection Center 2>

Figure 6:
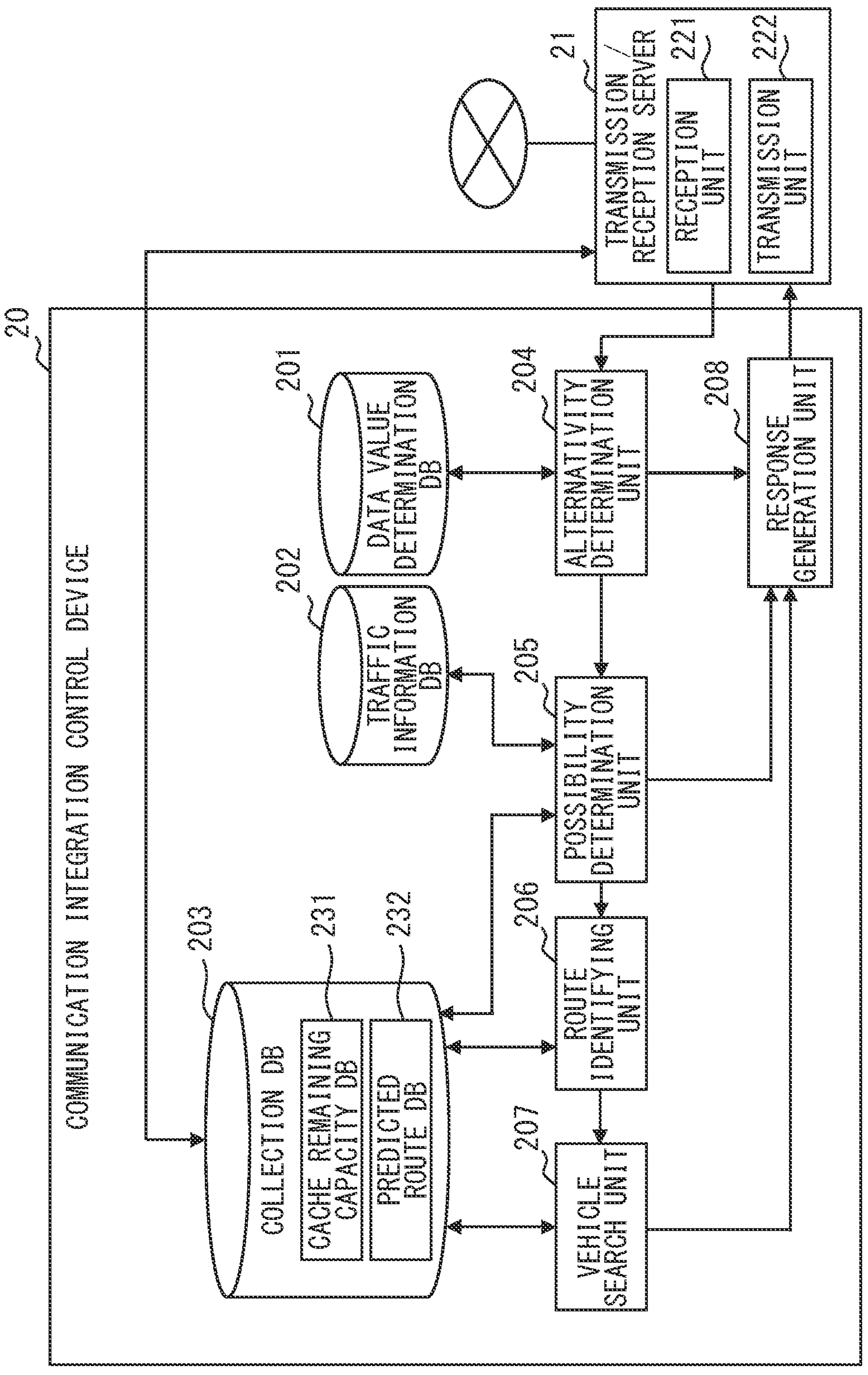
FIG. 6 is a diagram showing an example of a schematic configuration of a collection center and a communication integration control device.

A schematic configuration of the collection center 2 will be described with reference to FIG. 6. As shown in FIG. 6, the collection center 2 includes a communication integration control device 20 and a transmission/reception server 21. The transmission/reception server 21 communicates with the in-vehicle terminal 35 via a public communication network and a base station. Further, as shown in FIG. 6, the transmission/reception server 21 includes a reception unit 221 and a transmission unit 222 as functional blocks. The reception unit 221 receives the data transmitted from the in-vehicle terminal 35 and sends it to the communication integration control device 20. This reception unit 221 corresponds to a center-side reception unit. Further, the process of receiving the data transmitted from the in-vehicle terminal 35 by the reception unit 221 corresponds to a center-side reception process. The transmission unit 222 transmits a notice to the in-vehicle terminal 35 via the public communication network and the base station under the control of the communication integration control device 20. This transmission unit 222 corresponds to a center-side transmission unit.

The communication integration control device 20 includes, for example, a processor, a memory, an I/O, and a bus connecting these, and, by executing a control program stored in the memory, performs a process related to data collection (hereinafter, a data collection related process). The memory referred to here is a non-transitory, tangible storage medium that stores computer-readable programs and computer-readable data. The non-transitory, tangible storage medium is implemented by a semiconductor memory or the like. The communication integration control device 20 controls data upload from the in-vehicle terminal 35. The details of the communication integration control device 20 will be described in the following.

<Schematic Configuration of Communication Integration Control Device 20>

A schematic configuration of the communication integration control device 20 will now be described with reference to FIG. 6. As shown in FIG. 6, the communication integration control device 20 includes a data value determination database (hereinafter, data value determination DB) 201, a traffic information database (hereinafter, traffic information DB) 202, a collection database (hereinafter, collection DB) 203, an alternativity determination unit 204, a possibility determination unit 205, a route identifying unit 206, a vehicle search unit 207, and a response generation unit 208 as functional blocks. Note that a part or all of the functions executed by the communication integration control device 20 may be configured as hardware by one or a plurality of ICs or the like. Further, a part or all of the functional blocks included in the communication integration control device 20 may be realized by the combination of software execution by the processor and hardware members.

The data value determination DB 201 stores information used for alternativity determination, i.e., whether or not the target data is replaceable with alternative data, regarding which an inquiry (i.e., data necessity inquiry) has been received from the in-vehicle terminal 35. In an example, the data value determination DB 201 may be configured to store information of the data type of alternative data that is replaceable with the target data. For example, as the data type of alternative data that is replaceable with the target data, information of the data type of the data with high reproducibility may be stored. The data with high reproducibility as mentioned above refers to data such as road structure data or the like, which has little change over time and lacks accidental elements. One example of such data may be data of road surface markings and land features. Other examples of such data may be information on collection status of the target data for respective data types and respective data generation positions. This is because sufficiently-collected data is determined as usable as the target data having alternativity, i.e., being replaceable with alternative data.

The traffic information DB 202 stores information on an average traffic flow rate for each road section on the map. The average traffic flow rate may be expressed by the number of passing vehicles per unit time, or may be expressed by leveling in a plurality of stages. As the average traffic flow rate, the one statistically calculated by accumulating the data generation information of the target data collected from the in-vehicle terminals 35 of a plurality of vehicles may be used. In addition, those estimated according to the type of road section may be used. For example, it is estimated that urban areas have higher average traffic flow rate than suburbs.

The collection DB 203 stores the target data collected from the in-vehicle terminals 35 of a plurality of vehicles and the data generation information of the target data. The collection DB 203 may be configured to store the collected target data in association with the generation information of the target data. Further, in addition to the target data, the collection DB 203 also may store the remaining capacity information, the remaining capacity predicted value, the predicted route, the current position, and the like transmitted from the in-vehicle terminal 35 of each of the plurality of vehicles, specifically for each of those vehicles. The specificity of the data regarding which data corresponds to which vehicle may be established by associating information on vehicle identity of each vehicle with the data transmitted from each of those vehicles. Examples of information on the vehicle identity include a vehicle ID, a device ID of the wireless communication device 34, and the like.

Note that some information of the data value determination DB 201, such as information on the collection status of the target data for respective data types and respective data generation positions, may be provided as (i.e., may be borrowed from) the information stored in the collection DB 203.

Further, the collection DB 203 includes a cache remaining capacity DB 231 and a predicted route DB 232. The cache remaining capacity DB 231 stores the remaining capacity information and the remaining capacity predicted value transmitted from the in-vehicle terminal 35 of each vehicle. That is, the cache remaining capacity DB 231 stores the remaining capacity information and the remaining capacity predicted value for each vehicle. The cache remaining capacity DB 231 may be configured to store at least the remaining capacity information from among the remaining capacity information and the remaining capacity predicted value. The predicted route DB 232 stores the predicted route transmitted from the in-vehicle terminal 35 of each vehicle. That is, the predicted route DB 232 stores the predicted route for each vehicle. The predicted route DB 232 may be configured to store the current position transmitted from the in-vehicle terminal 35 of the vehicle in association with the predicted route of such vehicle.

When the reception unit 221 receives an inquiry as to whether or not the target data is necessary (i.e., data necessity inquiry) from the in-vehicle terminal 35, the alternativity determination unit 204 determines whether or not the target data is replaceable. For example, the alternativity determination unit 204 may refer to the information stored in the data value determination DB 201 based on the data type in the generation time information of the target data included in such inquiry, for determining whether or not the target data is replaceable. The process of determining the possibility of replacement of the target data by the alternativity determination unit 204 corresponds to the alternativity determination step.

The possibility determination unit 205 determines the possibility of re-acquiring the target data (hereinafter referred to as re-acquisition possibility) for the target data determined as having alternativity by the alternativity determination unit 204. The re-acquisition possibility is a possibility of re-acquiring the target data not only from the vehicle that has transmitted the inquiry as to whether or not the target data is necessary (i.e., data necessity inquiry), but also from the other vehicles other than such vehicle. Note that the re-acquisition possibility may also be a possibility that the target data is re-acquirable from a vehicle other than the vehicle that has transmitted the inquiry as to whether or not the target data is necessary.

As an example, the possibility determination unit 205 may determine the re-acquisition possibility of the target data from (i) the data generation position in the generation time information of the target data included in the data necessity inquiry received by the reception unit 221 and (ii) the information of the average traffic flow rate stored in the traffic information DB 202. Specifically, the possibility determination unit 205 determines higher re-acquisition possibility as the average traffic flow rate at the data generation position of the target data increases. On the other hand, the possibility determination unit 205 determines lower re-acquisition possibility as the average traffic flow rate at the data generation position of the target data decreases.

The re-acquisition possibility may be a continuous value according to the average traffic flow rate, or may be a value divided into a plurality of levels. The re-acquisition possibility may be expressed as two values, that is, one value representing re-acquisition possibility existing and other value representing no re-acquisition possibility, but hereafter, it is expressed by a plurality of values of three or more. In addition, in the determination of the re-acquisition possibility, information other than the average traffic flow rate may be used as long as such information varies depending on the ease of re-acquisition of the same target data. The process of determining the re-acquisition possibility by the possibility determination unit 205 corresponds to an alternativity determination process.

The route identifying unit 206 identifies a planned travel route of the vehicle from the predicted routes specific to each of the vehicles stored in the predicted route DB232. As an example, the predicted route may be identified as a planned travel route. The predicted route corresponds to route-identifying information. In order to reduce the processing load, the route identifying unit 206 may identify the planned travel route only for the vehicles sifted to be within a certain distance from the current position of the vehicle that has transmitted the inquiry as to whether or not the target data is necessary (i.e., data necessity inquiry). Note that the route identifying unit 206 may have other configuration other than the configuration in which the planned travel route is identified from the vehicle-specific predicted routes stored in the predicted route DB 232. For example, a predicted route of each of the vehicles may be calculated from the current position and the destination of the vehicle, and the predicted route may be identified as a planned travel route. The current position and the destination also correspond to the route-identifying information.

The vehicle search unit 207 performs a search process for determining whether or not a vehicle more suitable for collecting the target data exists, other than a vehicle that has transmitted an inquiry as to whether or not the target data is necessary (i.e., data necessity inquiry). The details of the search process will be described later.

The response generation unit 208 generates a notice for an inquiry regarding the necessity of the target data (i.e., data necessity inquiry), and returns the notice from the transmission/reception server 21 to the in-vehicle terminal 35 that has transmitted the inquiry. The details of the process in the response generation unit 208 will be described later.

<Necessity Response Related Process>

Figure 7:
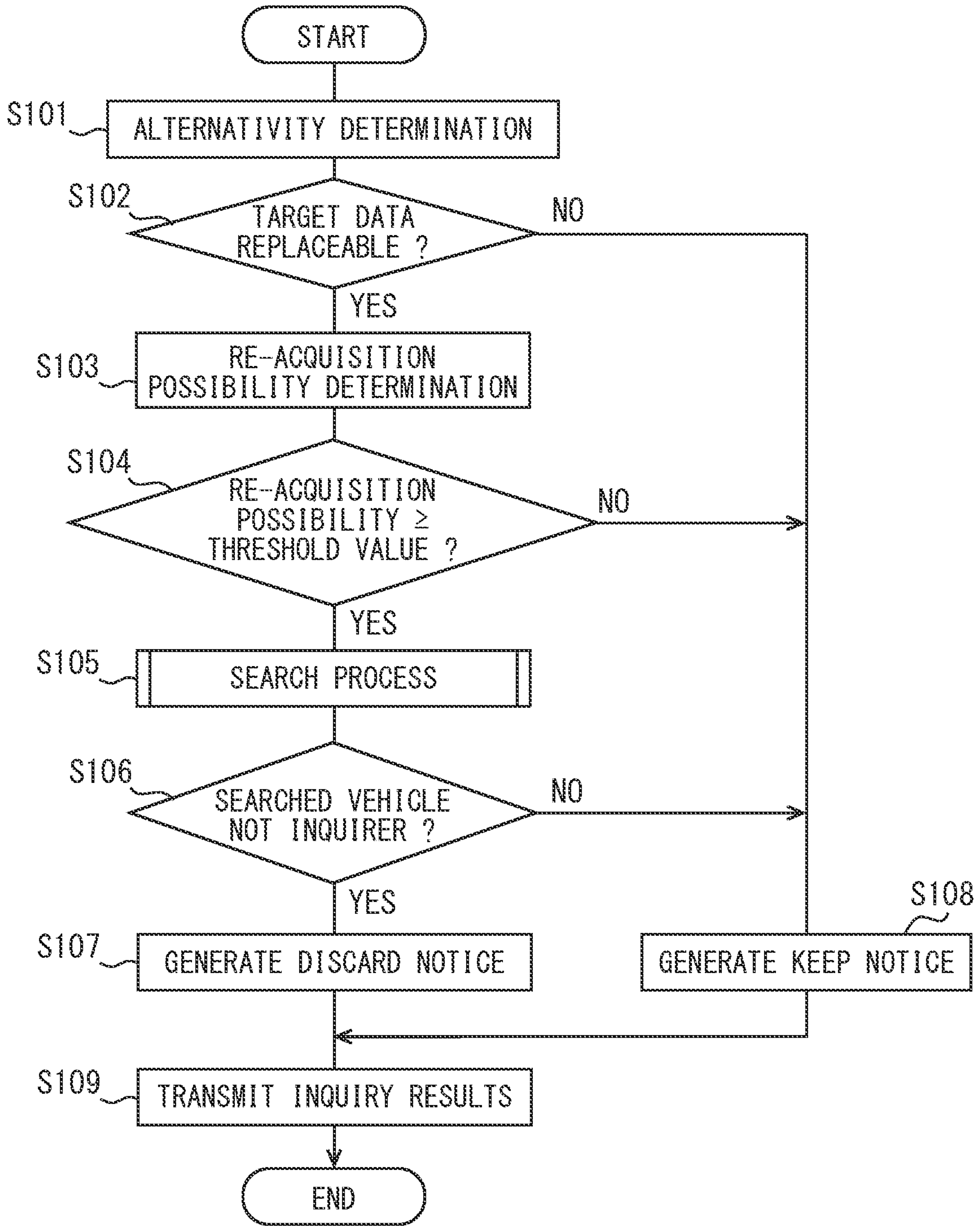
FIG. 7 is a flowchart showing an example of a flow of a necessity response-related process in the communication integration control device.
Figure 8:
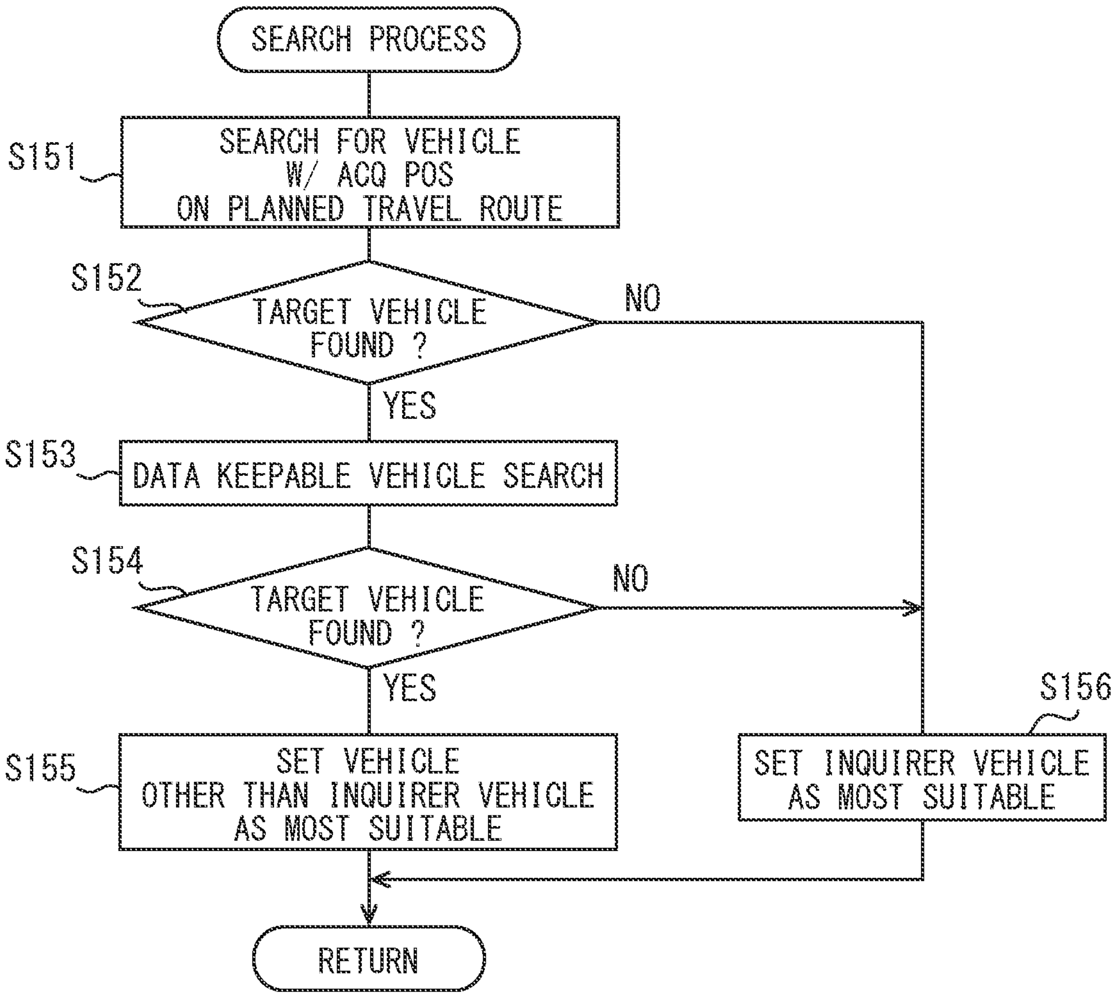
FIG. 8 is a flowchart showing an example of a flow of a search process of the necessity response-related process.

Here, using the flowcharts of FIGS. 7 to 8, an example of the flow of the process related to the response to the inquiry of the necessity of the target data in the communication integration control device 20 (hereinafter, a necessity response-related process) will be described. The flowchart of FIG. 7 may be configured to start when the reception unit 221 receives an inquiry as to whether or not the target data is necessary (i.e., data necessity inquiry). Execution of the steps included in the necessity response-related process by a processor corresponds to an execution of a data collection method. Further, a processor of the communication control device 30 performing steps in the data acquisition-related process and a processor of the communication integration control device 20 performing steps in the necessity response-related process correspond to an execution of the data collection method.

First, in step S101, the alternativity determination unit 204 determines whether or not the target data for which the inquiries about necessity are received by the reception unit 221 is replaceable. In step S102, if it is determined in S101 that the target data is replaceable (YES in S102), the process proceeds to step S103. On the other hand, if it is determined in S101 that the target data is not replaceable (NO in S102), the process proceeds to step S108.

In step S103, the possibility determination unit 205 determines re-acquisition possibility of the target data. In step S104, if the re-acquisition possibility determined in S103 is equal to or greater than a threshold value (YES in S104), the process proceeds to step S105. On the other hand, if the re-acquisition possibility determined in S103 is less than the threshold value (NO in S104), the process proceeds to step S108. The threshold value mentioned here is a value for distinguishing whether or not re-acquisition is expected, and is a value that can be arbitrarily set.

In step S105, the vehicle search unit 207 performs a search process, determines a most suitable vehicle for acquiring the target data, and proceeds to step S106. Here, an example of the flow of the search process will be described with reference to FIG. 8.

In step S151, the vehicle search unit 207 searches for a vehicle whose acquisition position of the target data regarding which a data necessity inquiry has been received by the reception unit 221 is a position on the planned travel route identified by the route identifying unit 206. As the acquisition position of the target data, the data generation position of the target data included in the data necessity inquiry may be used. The vehicle to be searched for may be a vehicle other than the vehicle equipped with the in-vehicle terminal 35 that has transmitted the data necessity inquiry (hereafter an inquirer vehicle).

In step S152, if there is a target vehicle found as a result of the search in S151 (YES in S152), the process proceeds to step S153. On the other hand, if there is no target vehicle found as a result of the search in S151 (NO in S152), the process proceeds to step S156.

In step S153, the vehicle search unit 207 searches for a vehicle that can keep the target data in the cache memory 322 regarding which the reception unit 221 has received the data necessity inquiry from among the target vehicles searched in S151 (i.e., DATA KEEPABLE VEHICEL SEARCH). An example of such search may be as follows. The vehicle search unit 207 determines, by using the remaining capacity predicted value stored in the cache remaining capacity DB 231, whether the target data can be kept in the cache memory 322 of the in-vehicle terminal 35 that has transmitted such remaining capacity predicted value. Therefore, the vehicle search unit 207 corresponds to a keepability determination unit. The target vehicles of such determination may be the vehicles searched in S151. Further, instead of using the remaining capacity predicted value, the remaining capacity information stored in the cache remaining capacity DB 231 may also be used. The remaining capacity predicted value and the remaining capacity information correspond to remaining capacity identifying information. The vehicle equipped with the cache memory 322, which is determined to be able to keep the target data regarding which the data necessity inquiry has been made, is a vehicle that satisfies the search condition of S153.

In step S154, if there is a target vehicle found as a result of the search in S153 (YES in S154), the process proceeds to step S155. On the other hand, if there is no target vehicle found as a result of the search in S153 (NO in S154), the process proceeds to step S156. As an example, when there is a vehicle equipped with the cache memory 322 that is determined to be able to keep the target data regarding which the data necessity inquiry has been made in the process of S153, such vehicle becomes the target vehicle.

In step S155, the vehicle search unit 207 determines that the target vehicle found as a result of the search in S153 other than the inquirer vehicle is the most suitable vehicle for acquiring the target data, and the process proceeds to step S106. On the other hand, in step S156, the vehicle search unit 207 determines that the inquirer vehicle is the most suitable vehicle for acquiring the target data, and the process proceeds to step S106.

Note that, in S155, the configuration may also be such that the vehicle search unit 207 searches for a vehicle as the most suitable one in which a keep time of the target data in the cache memory 322 is shortest, which would replace the original target data regarding which the data necessity inquiry has been made, from among the target vehicles found as a result of the search in S153. The target data serving as an alternative data which would replace the original target data regarding which the data necessity inquiry has been made is a target data acquired at the same data generation position as the original target data regarding which the data necessity inquiry has been made. The search described above may be performed by using, for example, (i) the planned travel route and the current position of the target vehicle found as a result of the search in S153, and (ii) the communication resource map. The communication resource map may be made available by acquiring the same as described above by the communication integration control device 20. More practically, the vehicle that is estimated to reach the free radio resource area on the communication resource map at the earliest timing may be searched for. According to the above configuration, the vehicle that travels on a route with the most abundant communication resources available for the vehicle and has the fastest replacement of the target data in the cache memory 322 is extracted. The communication integration control device 20 may be configured to transmit, to the in-vehicle terminal 35 of the searched vehicle, a keeping notice for keeping the same target data as the one regarding which the data necessity inquiry has been made.

Returning to FIG. 7, in step S106, if the vehicle searched in S105 is not the inquirer vehicle (YES in S106), the process proceeds to step S107. On the other hand, if the vehicle searched in S105 is the inquirer vehicle (NO in S106), the process proceeds to step S108.

In step S107, the response generation unit 208 generates a discard notice for discarding the target data regarding which the data necessity inquiry has been made. On the other hand, in step S108, the response generation unit 208 generates a keeping notice for keeping the target data regarding which the data necessity inquiry has been made. In step S109, when the discard notice is generated in S107, the response generation unit 208 causes the transmission/reception server 21 to transmit the discard notice in reply to the in-vehicle terminal 35 that has transmitted the data necessity inquiry of the target data. On the other hand, when the keeping notice is generated in S108, the response generation unit 208 causes the transmission/reception server 21 to transmit the keeping notice in reply to the in-vehicle terminal 35 that has transmitted the data necessity inquiry of the target data. The process step of S109 corresponds to a center-side transmission process.

Figure 10:
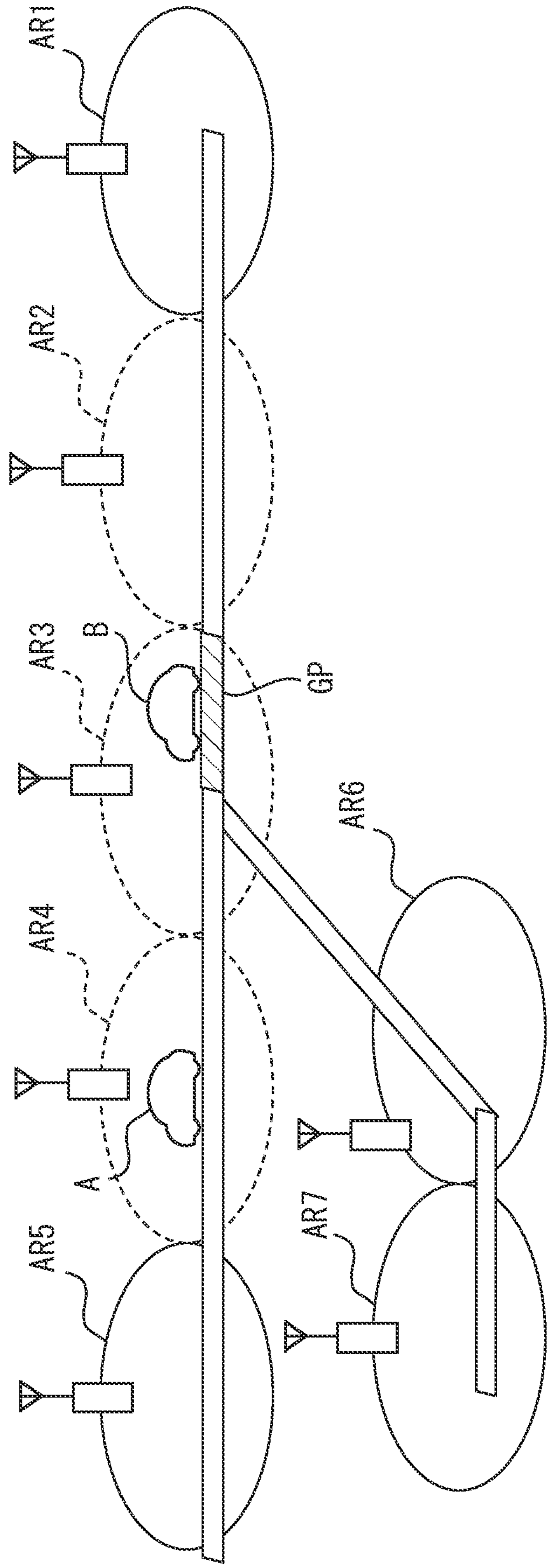
FIG. 10 is another diagram for explaining an outline of an example of the present embodiment.
Figure 11:
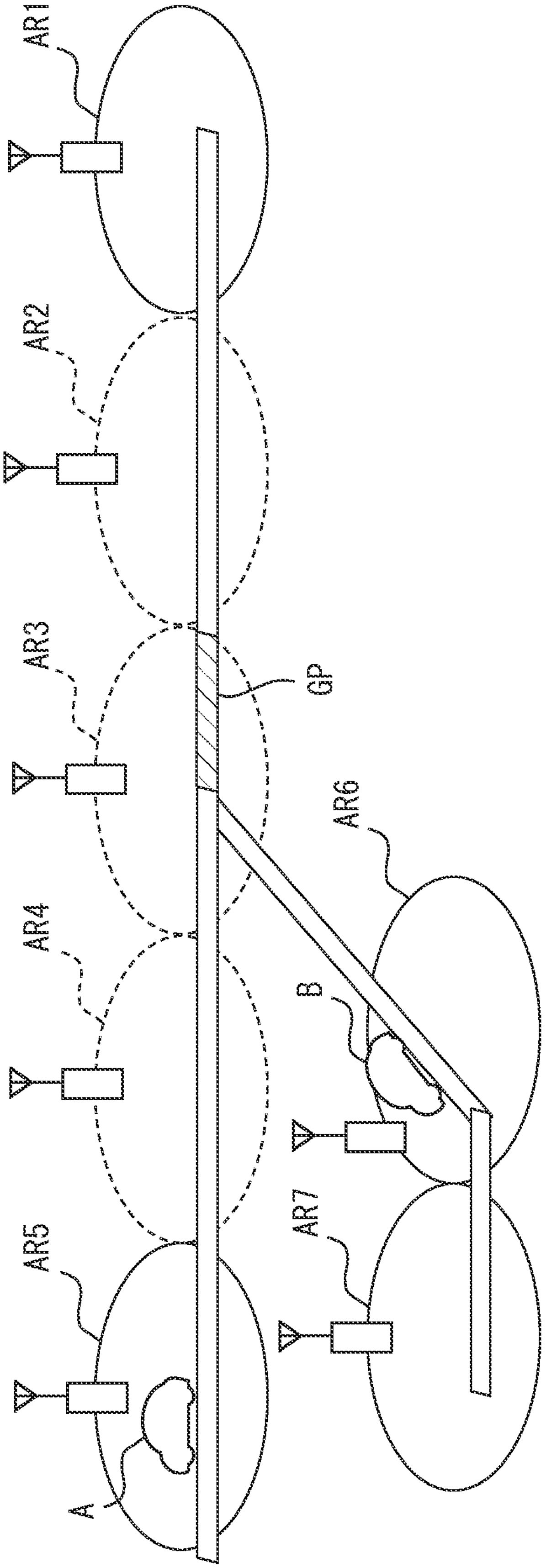
FIG. 11 is yet another diagram for explaining an outline of an example of the present embodiment.

Here, an overview of an example of the present embodiment will be described with reference to FIGS. 9 to 11. GP in the drawing indicates an acquisition position of the target data. A indicates a vehicle in which a shortage of the storage capacity of the cache memory 332 is predicted when the target data is acquired at the acquisition position GP. B indicates a vehicle having a sufficient storage capacity of the cache memory 332 and including the acquisition position GP in the planned travel route. C indicates a vehicle having a sufficient storage capacity of the cache memory 332 and not including the acquisition position GP in the planned travel route. AR1 to AR8 indicate respectively different base station areas. The circles in the solid lines among AR1 to AR8 indicate that there is a free radio resource. The circles in the broken lines in AR1 to AR8 indicate that there is no free radio resource.

Figure 9:
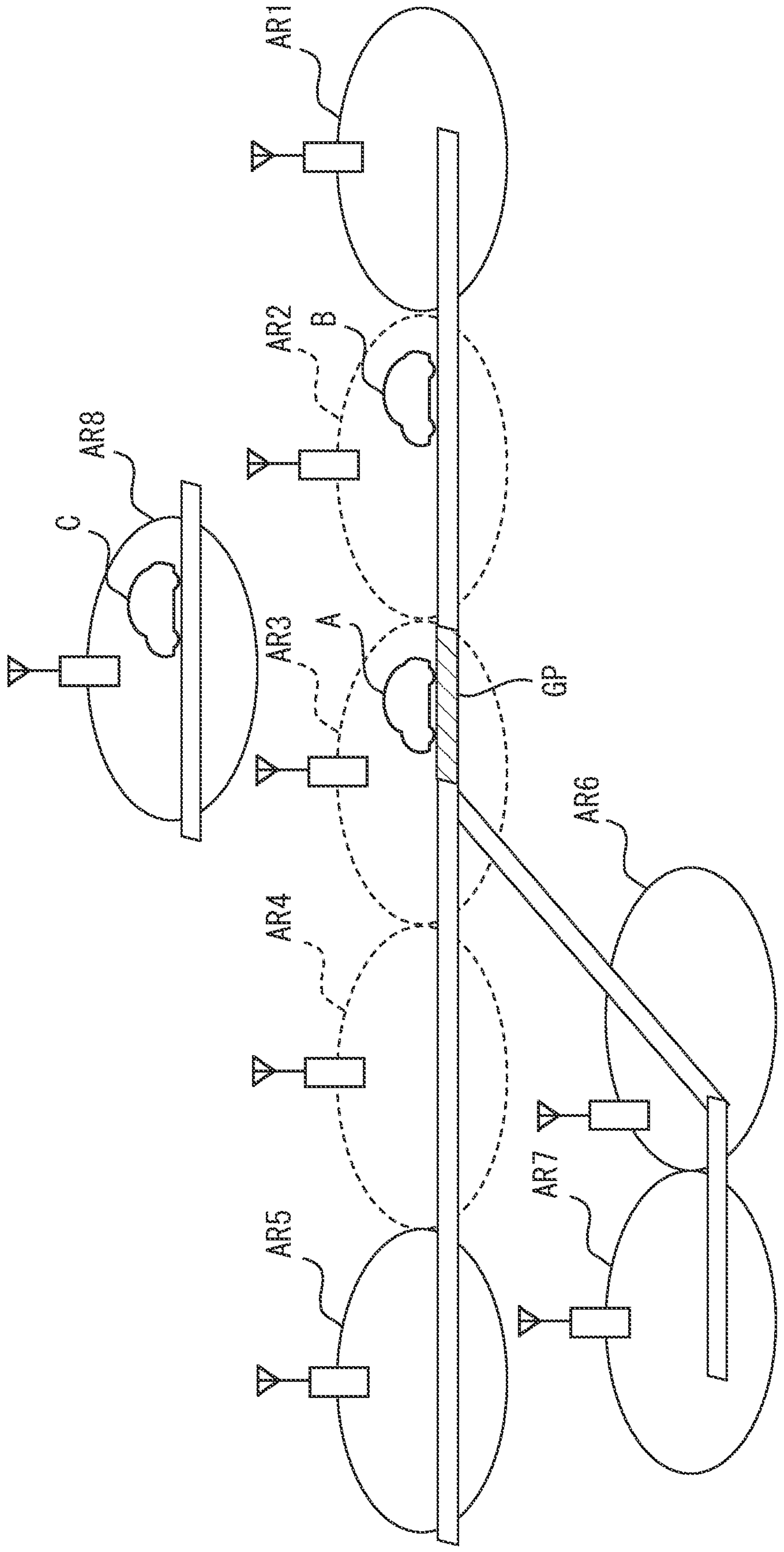
FIG. 9 is a diagram for explaining an outline of an example of the present embodiment.

In a scene of FIG. 9, the vehicle A acquires the target data at the acquisition position GP of the base station area AR3. However, since the vehicle A has no free radio resource and is expected to have a shortage of the storage capacity of the cache memory 332, the vehicle A inquires to the collection center 2 whether or not the target data is necessary. In response to the inquiry regarding the data necessity (i.e., data necessity inquiry), the communication integration control device 20 of the collection center 2 searches for a vehicle (hereinafter referred to as a most suitable vehicle) that is more suitable for collecting the target data than the vehicle A. The vehicle C located in the base station area AR8 is not searched as a most suitable vehicle because the acquisition position GP is not a position on the planned travel route. On the other hand, the vehicle B located in the base station area AR2 is searched as a most suitable vehicle because the cache memory 332 has a sufficient storage capacity and the acquisition position GP is a position on the planned travel route. Since the vehicle B other than the vehicle A has been searched as the most suitable vehicle, the communication integration control device 20 transmits a discard notice in reply to the in-vehicle terminal 35 of the vehicle A. In such manner, in the vehicle A, the acquired target data is discarded without being kept in the cache memory 332, and the storage capacity of the cache memory 332 is prevented from having a shortage.

Subsequently, in a scene of FIG. 10, the vehicle B travels from the base station area AR2 to the base station area AR3 along the planned travel route and reaches the acquisition position GP as planned. The vehicle B acquires the acquired data discarded by the vehicle A at the acquisition position GP. In the base station area AR3, since there is no free radio resource, the in-vehicle terminal 35 of the vehicle B keeps the acquired target data in the cache memory 332 without transmitting it. The vehicle A travels from the base station area AR3 to the base station area AR4. Since the base station area AR4 has no free radio resource, the in-vehicle terminal 35 of the vehicle A does not transmit the data kept in the cache memory 332 yet.

Subsequently, in a scene of FIG. 11, the vehicle A travels from the base station area AR4 to the base station area AR5. Since the base station area AR4 has a free radio resource, the in-vehicle terminal 35 of the vehicle A transmits the data kept in the cache memory 332 to the collection center 2 before a cache overflow occurs. In such manner, even if the vehicle A keeps a high-value data in the cache memory 332, it is made possible for the vehicle A to transmit the high-value data to the collection center 2 without discarding the high-value data. Further, the vehicle B travels from the base station area AR3 to the base station area AR6. Since the base station area AR6 has a free radio resource, the in-vehicle terminal 35 of the vehicle B transmits the data kept in the cache memory 332 to the collection center 2 before a cache overflow occurs. In such manner, even if the target data discarded by the vehicle A is a high-value data, it is made possible for the vehicle B to transmit the target data to the collection center 2.

Summary of the First Embodiment

According to the configuration of the first embodiment, the inquiry as to whether or not the target data is necessary (i.e., the data necessity inquiry) is transmitted from the in-vehicle terminal 35 which is predicted to have a shortage of the storage capacity of the cache memory 322 which temporarily stores the target data until it becomes transmittable. If the in-vehicle terminal 35, which is predicted to have a shortage of the storage capacity of the cache memory 322, keeps the acquired target data until it becomes transmittable, a situation is likely to occur in which the target data to be acquired thereafter cannot be transmitted to the collection center 2. On the other hand, in the configuration of the first embodiment, the in-vehicle terminal 35 that has transmitted the data necessity inquiry receives in reply a discard notice for discarding the target data, while, in case that the alternativity determination unit 204 determines that the target data does not have alternativity (i.e., cannot be replaced with alternative data), the keeping notice for keeping the target data is transmitted in reply to the in-vehicle terminal 35 that has transmitted the data necessity inquiry. If the target data is determined to have alternativity, there is a high possibility that the collection center 2 can replace the target data even if the target data is discarded according to the discard notice. Further, since the target data is discarded according to the discard notice, it is made possible to have a sufficient storage capacity of the cache memory 322 and to prevent the situation in which the target data to be acquired thereafter cannot be transmitted to the collection center 2 from occurring. On the other hand, even when there is a high possibility that the target data determined to have no alternativity cannot be replaced, such a target data is kept undiscarded according to the keeping notice, thereby making it more possible for the collection center 2 to collect the target data when the target data kept in the in-vehicle terminal 35 becomes transmittable. As a result, when collecting the data from the in-vehicle terminals 35 of a plurality of vehicles, it is made possible to prevent the situation in which the high-value data cannot be collected from occurring.

As described above, according to the configuration of the first embodiment, the in-vehicle terminal 35 of each vehicle and the collection center 2 can cooperate with each other to level the amount of usage of the cache memory 322 of each vehicle. Therefore, it is made possible to suppress a situation from happening, in which the cache overflow of the cache memory 322 is caused only in some of the relevant vehicles, and making it more difficult to cause a situation in which the high-value data is discarded, and making it less likely to encounter a situation in which the high-value data cannot be collected by the collection center 2.

According to the configuration of the first embodiment, even when the alternativity determination unit 204 determines that the target data is replaceable (i.e., has alternativity), when the re-acquisition possibility of the target data determined by the possibility determination unit 205 is less than the threshold value, the keeping notice is transmitted in reply to the in-vehicle terminal 35 that has transmitted the data necessity inquiry, i.e., an inquiry as to whether or not the target data is necessary. In such manner, the target data, which (a) has low re-acquisition possibility even if it is replaceable and (b) is not likely to be re-acquired by the collection center 2, will not be discarded by the in-vehicle terminal 35 that has transmitted the data necessity inquiry. Therefore, it is made more difficult for a situation to occur, in which the collection center 2 cannot collect the high-value data.

According to the configuration of the first embodiment, even when (i) the alternativity determination unit 204 determines that the target data has alternativity, and (ii) the re-acquisition possibility of the target data determined by the possibility determination unit 205 is equal to or higher than the threshold value, in case that there is no vehicle including the acquisition position of the target data in the planned travel route identified by the route identifying unit 206, the in-vehicle terminal 35 that has transmitted a transmission inquiry for transmitting the target data receives a keeping notice in reply. According to the above, even if there is a high re-acquisition possibility, if there is no vehicle that has a plan to actually acquire the target data and it is presumed that the target data cannot be re-acquired by any other vehicle, it is made possible not to let the in-vehicle terminal 35 that has transmitted the data necessity inquiry to discard the target data that is not highly possibly re-acquirable by the collection center 2. Therefore, it is made more difficult for a situation to occur, in which the collection center 2 cannot collect the high-value data.

According to the configuration of the first embodiment, even when (i) the alternativity determination unit 204 determines that the target data has alternativity, (ii) the re-acquisition possibility of the target data determined by the possibility determination unit 205 is equal to or higher than the threshold value, and (iii) there are vehicles including the acquisition position of the target data in the planned travel route identified by the route identifying unit 206, in case that the vehicles do not include one that is equipped with the cache memory 322 determined to be capable of keeping the target data by the vehicle search unit 207, the keeping notice is transmitted in reply to the in-vehicle terminal 35 that has transmitted the transmission inquiry of the target data. In such manner, even if there are vehicles that plan to actually acquire the target data, there is no vehicle that does not cause a shortage of the storage capacity of the cache memory 322, it is made possible not to let the in-vehicle terminal 35 that has transmitted the transmission inquiry to discard the target data that is not highly possibly re-acquirable by the collection center 2. Therefore, it is made more difficult for a situation to occur, in which the collection center 2 cannot collect the high-value data.

Second Embodiment

In the first embodiment, the communication control device 30 and the wireless communication device 34 are shown as having separate bodies/casing, but the configuration is not necessarily limited to the above. For example, the communication control device 30 and the wireless communication device 34 may be integrated to have one body.

Note that the present disclosure is not limited to the embodiments described above, and can variously be modified within the scope of the disclosure. An embodiment acquired by appropriately combining the technical features disclosed in the different embodiments is also included in the technical scope of the present disclosure. Further, the control unit and the method thereof described in the present disclosure may be realized by a dedicated computer which includes a processor programmed to perform one or more functions according to computer programs. Alternatively, the control unit and the method thereof described in the present disclosure may be realized by a dedicated hardware logic circuit. Alternatively, the control unit and the method thereof described in the present disclosure may be realized by one or more dedicated computers configured as a combination of a processor executing a computer program and one or more hardware logic circuits. Further, the computer program may also be stored in a computer-readable, non-transitory, tangible storage medium as instructions to be executed by a computer.

The invention claimed is:

1. A data collection system comprising:

an in-vehicle terminal mounted on a vehicle and including at least one of (i) at least one first processor and memory, and (ii) at least one first hardware logic circuit, configured to acquire data acquired during a travel of the vehicle, and a wireless transmitter/receiver transmitting the acquired data; and a collection center including a transmission/reception server reception unit receiving the data transmitted from in-vehicle terminals of multiple vehicles, wherein the in-vehicle terminal further includes a cache memory temporarily storing the acquired data until the data becomes transmittable by the wireless transmitter/receiver, the at least one of (i) the at least one first processor and memory, and (ii) the at least one first hardware logic circuit being further configured to predict a shortage of a storage capacity of the cache memory, the wireless transmitter/receiver transmits, to the collection center, a data necessity inquiry about necessity of the data when (i) the data has been acquired and (ii) the shortage of the storage capacity of the cache memory is predicted, the transmission/reception server of the collection center receives the data necessity inquiry transmitted from the in-vehicle terminal, the collection center further includes at least one of (i) at least one second processor and memory, and (ii) at least one second hardware logic circuit, configured to determine whether or not the data has alternativity when the data necessity inquiry transmitted from the in-vehicle terminal is received by the transmission/reception server, wherein the data is determined to have alternativity when the data is replaceable with alternative data, wherein the transmission/reception server is further configured to (i) transmit a discard notice back to the in-vehicle terminal that has transmitted the data necessity inquiry, and let the in-vehicle terminal discard the data based on a determination that the data has alternativity, and (ii) transmit a keeping notice back to the in-vehicle terminal that has transmitted the data necessity inquiry, and let the in-vehicle terminal to keep the data based on a determination that the data has no alternativity, the at least one of (i) the at least one first processor and memory, and (ii) the at least one first hardware logic circuit, are further configured to (i) discard, upon receiving the discard notice, the necessity-inquired data, for not storing the data in the cache memory, and (ii) storing, upon receiving the keeping notice, the necessity-inquired data in the cache memory, the at least one of (i) the at least one second processor and memory, and (ii) the at least one second hardware logic circuit are further configured to determine a re-acquisition possibility, which is a possibility of reacquiring the data that is determined to have alternativity, and in response to determining that the data has the alternativity, the transmission/reception server (i) transmits in reply the discard notice to the in-vehicle terminal that has transmitted the data necessity inquiry based on a condition that the data has the reaquirability of equal to or above a threshold value, and (ii) transmits in reply the keeping notice to the in-vehicle terminal that has transmitted the data necessity inquiry based on a condition that the data has the reaquirability of less than the threshold value.

2. The data collection system of claim 1, wherein the wireless transmitter/receiver transmits, in addition to the data necessity inquiry, a data acquisition position of the data to the collection center, the transmission/reception server unit also receives, in addition to the data necessity inquiry transmitted from the in-vehicle terminal, the data acquisition position of the data, and the at least one of (i) the at least one second processor and memory, and (ii) the at least one second hardware logic circuit are, regarding the data having the alternativity determined by the alternativity determination unit, further configured to (i) increase re-acquisition possibility of the data based on the data acquisition position, as an average traffic flow rate at the data acquisition position received by the transmission/reception server increases, and (ii) decrease re-acquisition possibility of the data based on the data acquisition position, as the average traffic flow rate at the data acquisition position received by the transmission/reception server decreases.

3. The data collection system of claim 1, wherein the wireless transmitter/receiver transmits to the collection center, in addition to the data necessity inquiry and the data acquisition position of the data, route-identifying information that identifies a planned travel route of the vehicle equipped with the in-vehicle terminal as a subject terminal, the transmission/reception server also receives from the in-vehicle terminals of the plurality of the vehicles the route-identifying information, in addition to the data necessity inquiry and the data acquisition position of the data transmitted from the in-vehicle terminal, and the at least one of (i) the at least one second processor and memory, and (ii) the at least one second hardware logic circuit are further configured to identify the planned travel route of the vehicle equipped with the in-vehicle terminal that has transmitted the route-identifying information by using the route-identifying information acquired by the transmission/reception server, and in case that (a) the data is determined to have the alternativity, and (b) such data has the re-acquisition possibility of equal to or above the threshold value, the transmission/reception server (i) transmits in reply the discard notice to the in-vehicle terminal that has transmitted the data necessity inquiry, based on a condition that the data acquisition position of the vehicle exists on the identified planned travel route, and (ii) transmits in reply the keeping notice to the in-vehicle terminal that has transmitted the data necessity inquiry based on a condition that the data acquisition position of the vehicle does not exist on the planned travel route.

4. The data collection system of claim 3, wherein the wireless transmitter/receiver also transmits remaining capacity identifying information identifying a remaining capacity of the storage capacity of the cache memory to the collection center, the at least one of (i) the at least one second processor and memory, and (ii) the at least one second hardware logic circuit are further configured to determine whether or not the cache memory of the in-vehicle terminal that has transmitted the remaining capacity identifying information can keep the data regarding which the data necessity has been inquired, by using the remaining capacity identifying information received by the transmission/reception server, and in case that (i) the data is determined to have the alternativity, (ii) the determined re-acquisition possibility of the data is equal to or above the threshold value, and (iii) the identified planned travel route of one or more vehicles includes the data acquisition position of the data, the transmission/reception server (i) transmits in reply the discard notice to the in-vehicle terminal that has transmitted the data necessity inquiry, when the one or more vehicles include a vehicle with the cache memory installed therein regarding which has been determined that the data can be kept therein, and (ii) transmits in reply the keeping notice to the in-vehicle terminal that has transmitted the data necessity inquiry when the one or more vehicles do not include a vehicle with the cache memory installed therein regarding which has been determined that the data can be kept therein.

5. The data collection system of claim 1, wherein the at least one of (i) the at least one first processor and memory, and (ii) the at least one first hardware logic circuit, are further configured to determine a value of the acquired data, acquired by the data acquisition unit, wherein a priority given to the data increases as the value of the data increases, and the wireless transmitter/receiver sequentially transmits, from among the acquired data, the data having a highest priority that is determined at a transmissible timing that allows the transmission of such data.

6. A collection center comprising:

a transmission/reception server receiving data acquired during a travel of each of a plurality of vehicles, which is acquired and transmitted by an in-vehicle terminal mounted on each of the plurality of vehicles; and at least one of (i) at least one first processor and memory, and (ii) at least one first hardware logic circuit, configured to determine an whether or not data is replaceable with alternative data when a data necessity inquiry of the data having been acquired by the in-vehicle terminal is received, the data necessity inquiry transmitted from the in-vehicle terminal in which a shortage of a storage capacity of cache memory is predicted, the cache memory being configured to temporarily store the data up to a data transmission timing at which the data becomes transmittable, wherein the transmission/reception server is further configured to (i) transmit a discard notice in reply, letting the in-vehicle terminal that has transmitted the data necessity inquiry to discard the data based on a determination that the data is replaceable, and (ii) transmit a keeping notice in reply, letting the in-vehicle terminal that has transmitted the data necessity inquiry to keep the data based on a determination that the data is not replaceable, the at least one of (i) the at least one first processor and memory, and (ii) the at least one first hardware logic circuit, are further configured to determine a re-acquisition possibility, which is a possibility of reacquiring the data that is determined to have alternativity, and when the data is determined to have the alternativity, the transmission/reception server is further configured to (i) transmit in reply the discard notice to the in-vehicle terminal that has transmitted the data necessity inquiry based on a condition that the data has the reaquirability of equal to or above a threshold value, and (ii) transmit in reply the keeping notice to the in-vehicle terminal that has transmitted the data necessity inquiry based on a condition that the data has the reaquirability of less than the threshold value.

7. A data collection method comprising the steps, which are executed by at least one processor, of:

a center-side reception process for receiving data acquired during a travel of each of a plurality of vehicles, which is acquired and transmitted by an in-vehicle terminal mounted on each of the plurality of vehicles;

an alternativity determination process for determining whether or not data is replaceable with alternative data when a data necessity inquiry of the data having been acquired by the in-vehicle terminal is received, the data necessity inquiry transmitted from the in-vehicle terminal in which a shortage is predicted about a storage capacity of cache memory for temporarily storing the data up to a data transmission timing at which the data becomes transmittable;

a center-side transmission process for (i) transmitting a discard notice in reply, letting the in-vehicle terminal that has transmitted the data necessity inquiry to discard the data based on a determination that the data is replaceable, and (ii) transmitting a keeping notice in replay, letting the in-vehicle terminal that has transmitted the data necessity inquiry to keep the data based on a determination that the data is not replaceable;

a data acquisition process for acquiring data acquired during a travel of the vehicle by using the in-vehicle terminal;

a data transmission process for transmitting the data acquired in the data acquisition process from the in-vehicle terminal to a collection center;

a capacity shortage prediction process for predicting a shortage of the storage capacity of the cache memory of the in-vehicle terminal, which temporarily stores the data acquired in the data acquisition process up to a data transmission timing at which the data becomes transmittable by the data transmission process;

a necessity inquiry process for transmitting, from the in-vehicle terminal to the collection center, a data necessity inquiry that inquires necessity of the data when (i) the data is acquired by the data acquisition process and (ii) the shortage of the storage capacity of the cache memory is predicted by the storage capacity shortage prediction process; and a storage processing/handling process for (i) discarding the necessity-inquired data not to store such data in the cache memory when the in-vehicle terminal has received the discard notice, and (ii) storing the necessity-inquired data in the cache memory when the in-vehicle terminal has received the keeping notice, wherein the method further includes:

determining a re-acquisition possibility, which is a possibility of reacquiring the data that is determined to have alternativity; and upon determining that the data has the alternativity, (i) transmitting in reply the discard notice to the in-vehicle terminal that has transmitted the data necessity inquiry based on a condition that the data has the reaquirability of equal to or above a threshold value, and (ii) transmitting in reply the keeping notice to the in-vehicle terminal that has transmitted the data necessity inquiry based on a condition that the data has the reaquirability of less than the threshold value.

8. A data collection system comprising:

an in-vehicle terminal mounted on a vehicle and including at least one of (i) at least one first processor and memory, and (ii) at least one first hardware logic circuit, configured to acquire data acquired during a travel of the vehicle, and a wireless transmitter/receiver transmitting the acquired data; and a collection center including a transmission/reception server receiving the data transmitted from in-vehicle terminals of multiple vehicles, wherein:

the in-vehicle terminal further includes a cache memory temporarily storing the acquired data until the data becomes transmittable by the wireless transmitter/receiver, the at least one of (i) the at least one first processor and memory, and (ii) the at least one first hardware logic circuit being further configured to predict a shortage of a storage capacity of the cache memory, the wireless transmitter/receiver transmits, to the collection center, a data necessity inquiry about necessity of the data when (i) the data has been acquired and (ii) the shortage of the storage capacity of the is predicted, the transmission/reception server of the collection center receives the data necessity inquiry transmitted from the in-vehicle terminal, the collection center further includes at least one of (i) at least one second processor and memory, and (ii) at least one second hardware logic circuit, configured to determine whether or not the data has alternativity when the data necessity inquiry transmitted from the in-vehicle terminal is received by the transmission/reception server, wherein the data is determined to have alternativity when the data is replaceable with alternative data, the transmission/reception server is further configured to (i) transmit a discard notice back to the in-vehicle terminal that has transmitted the data necessity inquiry, and let the in-vehicle terminal discard the data based on a determination that the data has alternativity, and (ii) transmit a keeping notice back to the in-vehicle terminal that has transmitted the data necessity inquiry, and let the in-vehicle terminal keep the data based on a determination that the data has no alternativity, the at least one of (i) at least one second processor and memory, and (ii) at least one second hardware logic circuit, configured to determine a re-acquisition possibility being a possibility of reacquiring the data that is determined to have alternativity;

the transmission/reception server, when it is determined that the data has the alternativity, (i) transmits in reply the discard notice to the in-vehicle terminal that has transmitted the data necessity inquiry based on a condition that the data has the reaquirability of equal to or above a threshold value, and (ii) transmits in reply the keeping notice to the in-vehicle terminal that has transmitted the data necessity inquiry based on a condition that the data has the reaquirability of less than the threshold value, the at least one of (i) the at least one first processor and memory, and (ii) the at least one first hardware logic circuit, are further configured to (i) discard, upon receiving the discard notice, the necessity-inquired data, for not storing the data in the cache memory, and (ii) storing, upon receiving the keeping notice, the necessity-inquired data in the cache memory, the at least one of (i) the at least one second processor and memory, and (ii) the at least one second hardware logic circuit are further configured to determine a re-acquisition possibility, which is a possibility of reacquiring the data that is determined to have alternativity, and in response to determining that the data has the alternativity, the transmission/reception server (i) transmits in reply the discard notice to the in-vehicle terminal that has transmitted the data necessity inquiry based on a condition that the data has the reaquirability of equal to or above a threshold value, and (ii) transmits in reply the keeping notice to the in-vehicle terminal that has transmitted the data necessity inquiry based on a condition that the data has the reaquirability of less than the threshold value.

* * * * *